Dec. 25, 1928.  
C. LE R. TRELEAVEN  
1,696,739  
COLOR PHOTOGRAPHY  
Filed June 2, 1926
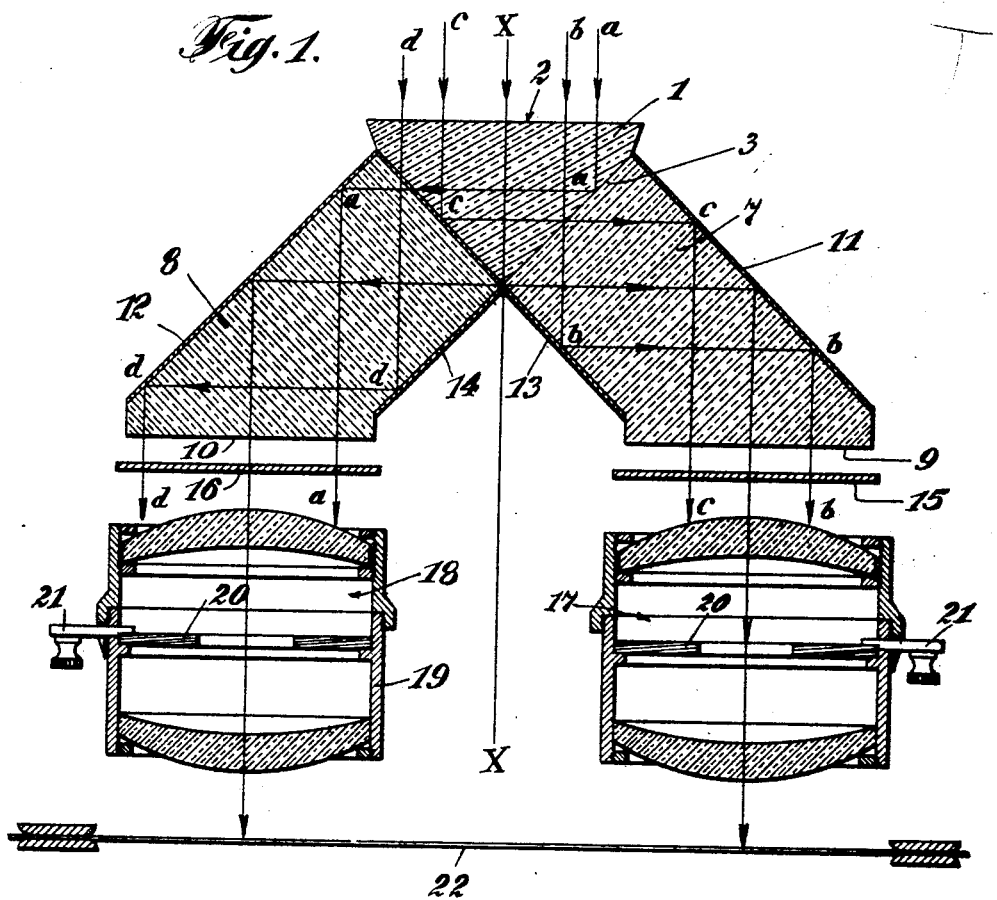
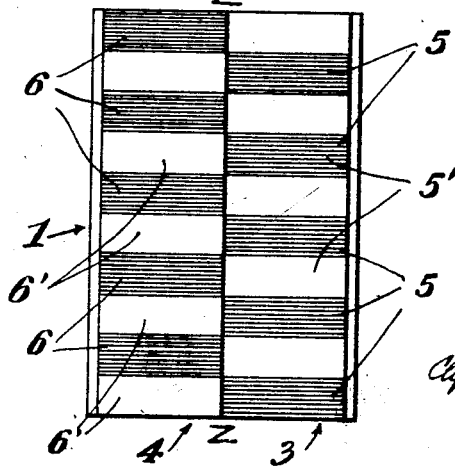

Patented Dec. 25, 1928.

1,696,739

UNITED STATES PATENT OFFICE.

CLIFFORD LE ROY TRELEAVEN, OF JACKSON HEIGHTS, NEW YORK, ASSIGNOR TO COLOR CINEMA PRODUCTIONS, INC., OF NEW YORK, N. Y., A CORPORATION OF DELAWARE.

COLOR PHOTOGRAPHY.

Application filed June 2, 1926. Serial No. 113,316.

This invention relates to color photography, and more particularly relates to an optical prism for use in this art.

It has been proposed heretofore to obtain photographically two simultaneous part images representing two approximately complementary color aspects of an object field; then to color these photographic images in the colors represented thereby, and then to project these images in exact superposition, one upon the other, to obtain a picture of the original scene in approximately natural colors. If the images when placed in superposition, one upon the other, do not register with each other, point for point, the reproduction of the scene on projection will be faulty, not only in clearness, but also in coloring. In view of the fact that in projection the images are highly magnified, the slightest lack of registration between the images on the film will cause noticeable and objectionable defect in the picture. Accordingly, it is essential that the images be so photographed that it will be possible to have exact registry, point for point, when they are superposed one upon the other. In order to obtain two images on separate areas of a film, or on separate photographic plates, which when superposed one on the other will register point for point throughout their entire areas, it is essential that the two images be photographed simultaneously from the same point of view along optically like paths. Moreover, the projected picture is objectionable if it does not have even illumination over a wide field, or if the picture fades at any particular part.

In order to obtain images which are clear and brilliant, and equally so over a wide field, it is necessary that the system, that is, the lenses looking, as it were, through the prism system, have a wide field of view.

The use of small size lenses has well known photographic disadvantages and objections.

The principal object of my invention is to provide a prism assembly whereby incident rays from a scene are split up in such manner that pairs of images may be photographically recorded on separate films or plates, or on the same film strip, in such manner and having such characteristics (notably the images shall be geometrically alike for all distances of the object) that positives made therefrom can yield a color picture or pictures free from defects arising from lack of registration.

Another object of my invention is to provide a prism of the character described which permits the use of wide lenses for performing the photographic operation, and a system in which the lenses have a wide field of view through the prism system.

A further object of this invention is to provide a prism for splitting light rays with a minimum loss of light reflected back toward the object.

Other objects of my invention will be in part obvious and in part pointed out hereinafter.

In order that a clearer understanding of my invention may be had, attention is hereby directed to the accompanying drawings, forming a part of this application and illustrating one possible embodiment of the invention.

Referring to the drawings, Fig. 1 is a sectional view showing a prism assembly embodying my invention, and showing diagrammatically associated therewith filters, lenses and a film for illustrating the application of the prism to the photographic art; and Fig. 2 is a plan view of the inside faces of the anterior prism element. Similar reference characters refer to similar parts throughout the several views of the drawings.

Referring to the drawings, the prism assembly includes a unit 1, which is triangular in transverse cross-section. The anterior flat and clear surface 2 is the surface which receives the incident rays from the scene, and is positioned at right angles to the axis of these rays. Each posterior surface 3 and 4 of this element is semi-transparent and semi-reflecting. To this end, these surfaces carry silver coating, as at 5 and 6, arranged in bars or strip directed toward each other; that is, transversely of the element. The bars 5 and 6 are of equal width and are separated along each surface by intermediate clear spaces, 5', 6', each of a width equal to the width of one bar. The bars on the surface 3 are staggered with respect to the bars on the surface 4, so that at the meeting edge of these surfaces, the bars on each surface will meet the clear spaces of the other surface, as clearly shown in Fig. 2.

Juxtaposed against each of the semi-transparent and semi-reflecting surfaces 3 and 4 of the element 1 is a flat surface of a prism unit 7 or 8. These have flat transparent emergent faces 9 and 10, respectively, which are parallel to each other and in the same plane, and the centers of which are preferably spaced apart a distance of 50 mm. Each of these prism units 7 and 8 has an overall reflecting outer surface 11, 12, and an overall reflecting inner surface 13, 14, these surfaces being at right angles to the plane of contact between the prism and the unit 1.

Behind each emergent face 9 and 10 of the prism is a suitable color filter, 15 and 16, and behind each filter is a lens, 17 and 18. The lenses are as nearly alike as possible, and are preferably provided with conventional mountings, such as 19, including an iris diaphragm 20 and conventional means 21 for adjusting this diaphragm. Each lens is adapted to focus the rays of light directed therethrough by the prism assembly on a photographic plate or film strip 22, which is located in a fixed plane at right angles to the axes of these lenses.

The paths of the light rays entering the incident face 2 of the prism assembly will be readily apparent. Those rays which strike the reflecting strips 5 of the surface 3 will be reflected across unit 1 and penetrate a clear portion of the surface 4, continuing thence in a straight line through a portion of the prism 8, until they meet the reflecting surface 12 of this prism, which surface will direct these rays toward the emergent face 10 in a direction approximately at right angles thereto, which path the rays will follow through and out of prism 8 through the filter 16 and to the lens 18. The path of such a ray is indicated by the line $a, a, a, a$.

The incident rays of light which penetrate the prism unit 1 and pass on through the clear spaces of surface 3 continue in the same direction through prism 7 until they meet the reflecting surface 13 thereof. This surface will bend these rays, so that they will pass across this prism unit until they meet the reflecting surface 11 thereof. This surface will project these rays toward the emergent face 9 in a direction approximately at right angles thereto, and these rays will pass out of the prism, through the filter 15, and to the lens 17. The path of one of such rays is indicated in the drawing by the line $b, b, b, b$.

The incident rays which strike the surface 4 of the prism unit 1 are affected thereby in exactly the same manner that the incident rays striking the surface 3 are affected by said surface. For instance, the rays which strike the silver bars 6 of surface 4 will follow the path shown by the line $c, c, c, c$ in the drawing. Those rays which strike the clear intermediate portion of surface 4 will follow the path shown by the line $d, d, d, d$ in the drawing.

The axis of the prism assembly is designated by the line X—X. It will be noted that the light-dividing device establishes exact symmetry about the single axis along which the undivided light from the object field is incident upon the system. The two paths traversed, respectively, by the separated components of the original light beam are precisely alike. The two images photographed on the film are taken from precisely the same point of view. Consequently, the two images simultaneously photographed on the film are geometrically exactly alike.

The length of the optical paths from the incident prism surface 2 to the lenses is exceedingly short, and consequently the system has greater covering power; that is, the path from the incident prism face 2, through the prism to the emergent faces 9 and 10, is short relative to the size of the aperture at the prism face 2. It will be noted that the length of each of these optical paths is approximately only twice the width of the incident prism face 2. As a result of this feature, a given lens set at given aperture is less restricted with this system than with a system in which the optical paths mentioned are longer relatively to the width of the incident prism face. The present system affords the lenses a wider and less restricted "field of view."

The shortening of the light paths in the present system to a value equal to about twice the aperture of the incident face 2, where the light enters the system, for the purpose mentioned above, results from dividing the semi-reflecting and semi-transparent portion of the system into two equal and complementary parts, which are disposed at right angles to each other, and are the same distance from the incident surface 2, and meeting along a common line which is parallel to and in alignment with the center line of the incident surface 2.

It will be noted that the reflecting surface 13 of a prism unit 7 is, in effect, a continuation of the semi-transparent and semi-reflecting surface 4 of prism unit 1. Also, that reflecting surface 14 of prism unit 8 is, in effect, a continuation of the semi-transparent and semi-reflecting surface 3 of prism unit 1. The respective reflecting surfaces meet and are in the same plane with the said semi-reflecting and semi-transparent surfaces. The mirror plane 4,13 and the mirror plane 3,14 intersect along a common line Z—Z. The half of each mirror plane posterior to (i. e., further from the object) this common line of intersection is completely silvered so as to be as highly reflecting as possible uniformly over this half; whereas the half of each mirror plane anterior to the common line of intersection is silvered in parallel strips disposed perpendicular to the common line of intersection, the alternating strips of silvered and unsilvered surface being of equal width, the same on both mirrors, and the silvered strips of one mirror being juxtaposed to the unsilvered strips of the other mirror. In this way a maximum amount of the light reflected from the silvered strips of one mirror is given free passage through the unsilvered strips of the other mirror, a minimum of light reflected from one mirror being also reflected by the intersecting mirror and hence projected back into the object space. (This is in contrast to a system in which the anterior halves of the two mirrors are half-silvered in the usual way or even where strips are used but run on one mirror perpendicular to the line of intersection of the mirrors and on the other parallel to that line. In both these cases half the light reflected by the anterior portion of one mirror fails to get by the anterior half of the other mirror but is again reflected by the latter being projected back into the object space and lost, i. e., approximately 25% of the light entering the system is reflected back toward the object and never reaches the lenses; this in addition to the usual reflection losses at each surface.)

From the above it will be readily apparent that the system above described embodies exact symmetry about a single axis along which the light is gathered. The incident rays from the object field will be separated into two identical components, which will travel along optical paths which are exactly alike. The system obtains both images from precisely the same point of view. The images photographed on the film will be exactly geometrically alike for all distances of the object from the incident prism face. The system has such wide covering power and wide field of view as will permit the photographing of the images on standard size film by means of two-inch lenses positioned behind the prism assembly. The wide separation of the emergent faces, permitting the separation of the lenses a similar distance, gives ample space for the use and operation of lens mountings of ordinary size, equipped with suitable iris diaphragms.

Further, it will be apparent that a minimum amount of light will be reflected back toward the object and, therefore, the loss of light will be small, and the increased intensity will yield better and more brilliant images, for any given size of lens aperture and time of exposure.

It is to be understood that instead of using prisms, the system may be duplicated by means of simple mirrors which have reflecting surfaces and semi-transparent and semi-reflecting surfaces similar to the surfaces of the prisms and placed in similar locations.

It is to be understood, also, that instead of using two lenses behind the prism assembly, one behind each emergent face thereof, a single lens may be employed in front of the incident face of the assembly.

The substitution of mirrors for prisms, and vice versa, and the alternative use of a single lens in front of the system or two lenses behind the system, are well recognized in the art.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. An optical system of the character described comprising, in combination, two mirrors crossing each other at a common line parallel to the center line of the incident component of the system, the portions of these mirrors anterior to said line being silvered in parallel strips disposed perpendicular to said line of intersection and having intermediate transparent strips, the portion of each mirror posterior to said common line being reflecting overall, and a reflecting mirror parallel to each of said posterior reflecting portions, spaced therefrom and positioned in the path of rays reflected therefrom, said mirrors constituting means for dividing the incident beam of light into two beams which are geometrically alike and follow like optical paths.

2. An optical system of the character described, comprising in combination two semi-transparent and semi-reflecting surfaces meeting edge to edge along a line perpendicular to the center line of the incident component of the system, reflectors posterior to said common line, intercepting the rays passing through said surfaces, and two reflecting surfaces, each positioned to intercept rays reflected by one of the semi-transparent and semi-reflecting surfaces and from one of the reflectors, said reflecting surfaces projecting similar image-bearing beams along parallel spaced optical paths.

This specification signed this 28th day of May, 1926.

CLIFFORD LE ROY TRELEAVEN.